(12) United States Patent
Shah et al.

(10) Patent No.: US 11,350,256 B2
(45) Date of Patent: May 31, 2022

(54) AUTOMATED DETECTION OF CHANGE OF OWNERSHIP OF ASSETS

(71) Applicant: Aeris Communications, Inc., San Jose, CA (US)

(72) Inventors: Alpa Shah, Pleasanton, CA (US); Anil Goel, New Delhi (IN); Subramanian Balakrishnan, Cupertino, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 17/083,880

(22) Filed: Oct. 29, 2020

(65) Prior Publication Data

US 2021/0136538 A1    May 6, 2021

Related U.S. Application Data

(60) Provisional application No. 62/927,857, filed on Oct. 30, 2019.

(51) Int. Cl.
*G08G 1/123* (2006.01)
*H04W 4/35* (2018.01)
(Continued)

(52) U.S. Cl.
CPC .............. *H04W 4/35* (2018.02); *G07C 5/008* (2013.01); *G07C 5/0808* (2013.01); *H04W 4/025* (2013.01); *H04W 4/029* (2018.02)

(58) Field of Classification Search
CPC ....... H04W 4/35; H04W 4/029; H04W 4/025; G07C 5/0808; G07C 5/008
(Continued)

(56) References Cited

U.S. PATENT DOCUMENTS 9,870,649 B1    1/2018 Fields
10,319,162 B1   6/2019 Meadow
(Continued)

FOREIGN PATENT DOCUMENTS

SE    1650379 A1    10/2017
WO    2019185217 A1    10/2019

OTHER PUBLICATIONS

Khan, "Enhancing Privacy in IoT Devices through Automated Handling of Ownership Change", Retrieved from the Internet: https://aaltodoc.aalto.fi/bitstream/handle/123456789/27906/master_Khan_Md_2017.pdf?sequence=1, Jun. 30, 2017.
(Continued)

*Primary Examiner* — Tai T Nguyen
(74) *Attorney, Agent, or Firm* — Brundidge & Stanger, P.C.

(57) ABSTRACT

In one example embodiment, a computer-implemented method and system for automated detection of change of ownership of one or more assets are disclosed. The method includes learning and storing location information of at least one asset; detecting a location where no movement of the at least one asset has occurred over a pre-determined duration of time; determining whether the detected location is classified as a location of interest based on a pre-defined criteria; preparing a data model for the at least one asset to learn and analyze determined location of interest; classifying the determined locations of interests based on frequency of occurrence of pre-determined events; comparing new data to the data model; and determining probability of change of ownership of the at least one asset as a prediction score as a result of the comparison.

27 Claims, 7 Drawing Sheets

(51) Int. Cl.
    *H04W 4/029*     (2018.01)
    *H04W 4/02*     (2018.01)
    *G07C 5/08*     (2006.01)
    *G07C 5/00*     (2006.01)

(58) Field of Classification Search
    USPC .......................................................... 340/989
    See application file for complete search history.

(56) References Cited

U.S. PATENT DOCUMENTS

| | | | |
|---|---|---|---|
| 10,399,493 B2 | 9/2019 | Adams | |
| 2019/0340013 A1* | 11/2019 | Celia | G06Q 10/067 |
| 2020/0059359 A1* | 2/2020 | Sugano | H04L 9/0894 |
| 2020/0328963 A1* | 10/2020 | Ordway | G06Q 20/20 |

OTHER PUBLICATIONS

Valiev, "Automatic Ownership Change Detection for IoT Devices", Retrieved from the Internet: https://pdfs.semanticscholar.org/725a/ba8a971cf564e4577ee0e8e420128a202c7f.pdf, Jul. 2, 2018.

\* cited by examiner

400 Location

AUTOMATED DETECTION OF CHANGE OF OWNERSHIP OF ASSETS

CROSS-REFERENCE TO RELATED APPLICATION

This application claims the benefit of U.S. Provisional Patent Application No. 62/927,857, filed on Oct. 30, 2019, entitled "AUTOMATED DETECTION OF CHANGE OF OWNERSHIP OF IOT DEVICES," which is incorporated herein by reference in its entirety.

FIELD OF THE INVENTION

The embodiments described herein relate generally to cellular networks and more particularly to automated detection of ownership change of assets with IoT devices capable of communication over the cellular networks installed in them.

BACKGROUND

In many Internet-of-Things (IoT)/Machine-to-Machine (M2M) solutions, particularly running on moving machines, also known as mobile assets or assets, for example, vehicles, heavy machinery such as mobile farming equipment etc., it may be useful to the Original Equipment Manufacturer (OEM) or financer of the asset to know if the ownership of the asset has changed.

SUMMARY

In one example embodiment, a computer implemented method for automated detection of change of ownership of an asset is disclosed. The method includes learning and storing location information of at least one asset; detecting a location where no movement of the at least one asset has occurred over a pre-determined duration of time; determining whether the detected location is classified as a location of interest based on a pre-defined criteria; preparing a data model for the at least one asset to learn and analyze determined location of interest; classifying the determined locations of interests based on frequency of occurrence of pre-determined events; comparing new data to the data model; and determining probability of change of ownership of the asset as a prediction score as a result of the comparison.

In another example embodiment, a system for automated detection of change of ownership of the asset is disclosed. The system for automated detection of change of ownership of an asset comprises at least one mobile asset, a data processing system and a user interface, wherein the data processing system further includes a location-aware database, wherein the database learns and stores location information of the at least one asset; a processor, wherein the processor detects a location where no movement of the at least one asset has occurred over a pre-determined duration of time; determines whether the detected location is classified as a location of interest based on a pre-defined criteria; prepares a data model for the at least one asset to learn and analyze determined location of interest; classifies the determined locations of interests based on frequency of occurrence of pre-determined events; compares new data to the data model; and determines probability of change of ownership of the asset as a prediction score as a result of the comparison.

In an embodiment, a non-transitory computer-readable medium for automated detection of change of ownership of an asset is disclosed. The computer readable medium includes executable instructions stored therein that, when executed, cause one or more processors corresponding to a system for automated detection of change of ownership of an asset having a database, a data processing system including a database, a processor and a user interface to perform operations including learning and storing location information of at least one seets; detecting a location where no movement of the at least one asset has occurred over a pre-determined duration of time; determining whether the detected location is classified as a location of interest based on a pre-defined criteria; preparing a data model for the at least one asset to learn and analyze determined location of interest; classifying the determined locations of interests based on frequency of occurrence of pre-determined events; comparing new data to the data model; and determining probability of change of ownership of the asset as a prediction score as a result of the comparison.

In an embodiment, the method, system and computer program product for automated detection of change of ownership of an asset further includes analyzing driving pattern for the asset to determine driving pattern mismatch score and augmenting change of ownership prediction score with the driving pattern mismatch score.

In an embodiment, the method, system and computer program product for automated detection of change of ownership of an asset further includes analyzing usage pattern for the asset to determine usage pattern mismatch score and augmenting change of ownership prediction score with the usage pattern mismatch score.

DETAILED DESCRIPTION

The embodiments described herein relate generally to wireless networks and more particularly to the automated detection of change of ownership of assets or mobile assets, that are capable of moving, connected to a cellular network. An asset may be defined as a thing on which the IoT device capable of communication is installed. The assets thus have the ability to transmit data over the internet via IoT devices capable of communication installed in them. The transmission may also take place, for instance, through a blue-tooth connection to one's phone which uses cellular connectivity. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the embodiments described herein are not intended to be limited to the embodiments shown, but is to be accorded the widest scope consistent with the principles and features described herein.

In many Internet-of-Things (IoT)/Machine-to-Machine (M2M) solutions, particularly those running on moving machines, also known as assets, for example, vehicles, heavy machinery such as mobile farming equipment etc., it may be useful to the Original Equipment Manufacturer (OEM) or financer of the asset to know if the ownership of the asset has changed. Within the field of asset financing, change in ownership of the asset is one of the reasons for non-payment of loans. In case of general connected vehicle space, the ownership change is an interesting event for the solution provider. Payment of signed up services, signing up for new services etc. can be triggered or followed up by the provider if the knowledge of change of ownership is available to the solution provider.

This invention pertains to automatic learning of resting places of assets such as vehicles using machine learning, for example, an asset's location data over time with rest period duration; driving events data, for example, driving data like hard braking, hard turns, revving, fast acceleration and the like over time and a sudden change in driving pattern; and usage pattern data for the asset, e.g., distance travelled, time travelled, night time driving, number of daily trips etc. Similarly, for heavy machinery such as mobile farming equipment etc. using machine learning, for example, an asset's location data over time with rest period duration; usage events data, for example, usage events data like fast acceleration over time and sudden changes in movement; and usage pattern data for the asset, e.g., distance traversed, duration of use, time of use, frequency of use etc.

For connected assets such as a vehicles, or heavy machinery such as mobile farming equipment etc., telemetry data includes time and location information. The asset's macro movement with rest period duration can be used to learn frequently visited places for the assets as well as the owners. As drivers drive the vehicles for their day-to-day activities, they stop at particular locations at particular times. The present invention helps identify locations where the vehicles have stopped on a regular basis at specific times of the day by progressively learning such places as places of interest for that asset over time. A prediction model is based on the assumption and expectation that the asset gets parked on a certain location on regular basis. Thus, a change in location at a particular time may trigger a possibility that the ownership of that asset has changed. The prediction model is based on existing data generated by the service 'Asset based learned places'.

Additionally, a particular driver may have his/her own driving style/pattern and/or a particular usage pattern for the asset, which are driven, may also be detected. Telemetry data may also provide data regarding behavioral pattern over period such as driving pattern and/or asset usage pattern and change in behavioral pattern over a period may also be used to detect and/or confirm potential changes in ownership of that asset using machine learning.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In one example embodiment, a computer implemented method for automated detection of change of ownership of one or more assets is disclosed. The method includes learning and storing location information of at least one asset; detecting a location where no movement of the at least one asset has occurred over a pre-determined duration of time; determining whether the detected location is classified as a location of interest based on a pre-defined criteria; preparing a data model for the at least one asset to learn and analyze determined location of interest; classifying the determined locations of interests based on frequency of occurrence of pre-determined events; comparing new data to the data model; and determining probability of change of ownership of the asset as a prediction score as a result of the comparison.

In another example embodiment, a system for automated detection of change of ownership of one or more assets is disclosed. The system for automated detection of change of ownership of an asset comprises at least one asset, a data processing system and a user interface, wherein the data processing system further includes a location-aware database, wherein the database learns and stores location information of the at least one asset; a processor, wherein the processor detects a location where no movement of the at least one asset has occurred over a pre-determined duration of time; determines whether the detected location is classified as a location of interest based on a pre-defined criteria; prepares a data model for the at least one asset to learn and analyze determined location of interest; classifies the determined locations of interests based on frequency of occurrence of pre-determined events; compares new data to the data model; and determines probability of change of ownership of the asset as a prediction score as a result of the comparison.

In an embodiment, a non-transitory computer-readable medium for automated detection of change of ownership of one or more assets is disclosed. The computer readable medium includes executable instructions stored therein that, when executed, cause one or more processors corresponding to a system for automated detection of change of ownership of an asset having a database, a data processing system including a database, a processor and a user interface to perform operations including learning and storing location information of at least one asset; detecting a location where no movement of the at least one asset has occurred over a pre-determined duration of time; determining whether the detected location is classified as a location of interest based on a pre-defined criteria; preparing a data model for the at least one asset to learn and analyze determined location of interest; classifying the determined locations of interests based on frequency of occurrence of pre-determined events; comparing new data to the data model; and determining probability of change of ownership of the asset as a prediction score as a result of the comparison.

In an embodiment, the method, system and computer program product for automated detection of change of ownership of one or more assets further includes analyzing driving pattern for the asset to determine driving pattern mismatch score and augmenting change of ownership prediction score with the driving pattern mismatch score.

In an embodiment, the method, system and computer program product for automated detection of change of ownership of one or more assets further includes analyzing usage pattern for the asset to determine usage pattern mismatch score and augmenting change of ownership prediction score with the usage pattern mismatch score.

In an embodiment, the ownership change for an asset may be deduced or derived from data collected for a single customer/account or for all interested customers/accounts, also known as tenants, including different stakeholders. For example, if the asset holder changes financing agreement from one entity (tenant) to another entity (tenant), the asset change of ownership platform may be aware of such change and still continue to collect data across different customers/account. For security and/or privacy purposes, the collected data may be stored and accessed only by those permitted by the system provider and/or the asset owner. Thus, the method, system and computer program product works with single tenant/account or across multiple tenants/accounts for a particular asset.

Figure 1:
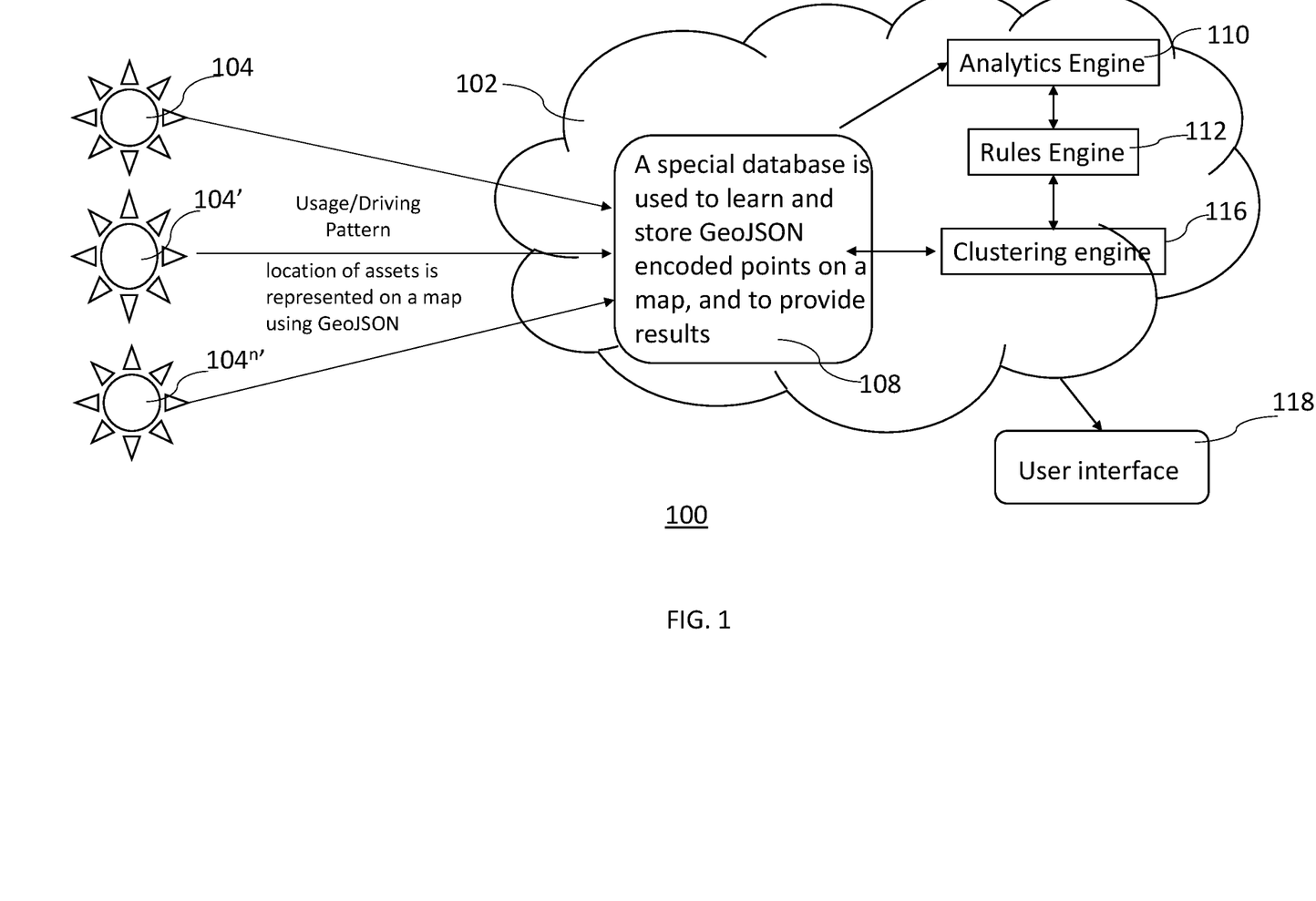
FIG. 1 is an overview diagram for the method and system for automated detection of change of ownership of one or more assets according to an embodiment described herein.

FIG. 1 is an overview diagram for the method and system for automated detection of change of ownership of one or more assets according to an embodiment described herein. As described herein, the system 100 includes assets 104, 104', . . . 104''', a data processing system 102, including a storage database 108, an analytics engine 110, an optional rules engine 112, data augmentation engine 114, clustering engine 116, and a user interface 118. The data processing system may include different functional components described above as part of one data processor or may be present as more than one data processors.

The mobile assets 104, 104', . . . 104''' may include communication devices, for example, vehicles connected to the cellular network or cellular-enabled devices via SIMs that are installed in the communication devices are either integrated in the vehicle itself or removably installed in the vehicle. Similarly, in case of heavy machinery such as mobile farming equipment etc., the assets may include communication devices connected to the cellular network or cellular-enabled devices via SIMs that are installed in the communication devices are either integrated in the heavy machinery itself or removably installed in the heavy machinery. These communication devices may transmit relevant vehicle data as device data to storage database 108 and/or the data processing system 102 of the monitoring system using a wireless communication technology, for example, a radio module or WiFi etc. In an embodiment, the device data for the asset may also be received from network elements.

The system configuration 100 may include an instance of a client application with a user interface 118 hosted thereon, for example, a desktop application provided through a web-based portal used by the OEM or other interested party such as financing entity to manage mobile assets, for example vehicles, heavy machinery such as mobile farming equipment etc. and/or application operating on mobile devices, such as smartphones, used by the OEM or other interested party such as financing entity to manage mobile assets or to access the information on the go, anywhere, any time.

The storage database 108 may be a special database, also known as a location aware database, which is used to learn and store GeoJSON encoded points on a map, and to provide results, for example, an instance offered by a provider of cloud computing services. The data is gathered into the storage database 108. For example, the system involves usage of a computer to determine proximity to a known place of interest among a vast number of such locations on a map. A special kind of encoding called GeoJSON may be used to represent such points on a map. A special database, also known as a location-aware database, may be used to handle GeoJSON encoded points on a map, indexed appropriately based on geolocation to provide results in an efficient manner when requesting to display it on a map. The gathered data may include location information along with the device records for the asset, for example, asset identifier, location of the asset, location of the stop, duration of the stop, time of the day for the stop, day of the week for the stop, etc.

The algorithm may be designed to work within the SaaS (Software as a Service) model where one physical database may be maintained for all assets.

The algorithm may first scan through the device records for the asset and arrange them sequentially with respect to time, also called as a discovery process. It may then detect times and places where no movement of the mobile asset has occurred over a pre-determined time duration by the analytics engine 110. These may be labelled as resting places for the mobile asset, for example, the vehicle or the heavy machinery such as mobile farming equipment etc. The algorithm may then make a decision about inclusion of a place within the storage database as a resting location of the vehicle such as home of the vehicle owner or place of work of the vehicle owner. For example, if the learned/discovered place/location should be included using rules engine 112 as a valid stop-location or location/place of interest based on pre-defined criteria using analytics engine 110, then the location will be appropriately marked in the storage database as a learned/discovered location of rest for that asset. Table 1 illustrates an exemplary data table for gathered data.

The discovered/learned places may then be clustered by the clustering engine 116 of the data processing system 102 to form bigger groups based on location. For example, locations of interest detected by the system, within a proximity radius of a few hundred meters from a known place of interest, may be grouped together as a cluster. The radius of proximity may thus define the granularity of the discovered/learned places on a map. Several such collections or clusters with different radii of separation—all of which may be derived from the base collection with lowest granularity, may be stored in database 108 and presented to the user via user interface 118. Although the example provided here uses a few hundred meters as a radius of proximity, other radii of proximity may be used.

One of the typical problems associated in using aggregates of several places is the inherent risk of placing the aggregated value on a location which may or may not be an actual location on the map, for example, the aggregate location may turn out to be a water body in the area for land based assets. The algorithm of the present invention is designed to avoid such a situation by taking the modal value when aggregating over nearby locations. Different criteria may be used when creating the locations with larger radius of separation, for example, the criteria used for aggregating may specify that "all locations must be 'at least' Y meters away from each other" where various values of Y may be used for creating locations or location clusters with different granularity.

The pre-defined criteria for inclusion may include any of: time of the visit, duration of time spent by the at least one asset at the location, number of visits to the location, and frequency of visits such as daily, weekly, monthly by the at least one asset to the location or a combination thereof. Table 1 illustrates an exemplary data table for gathered data.

TABLE 1

| ColumnName | ColumnType | isNullable | PartOfKey | Remarks |
|---|---|---|---|---|
| ID | Bigint | No | Yes | |
| ACCOUNT_ID | Bigint | See Remarks | See Remarks | Optional Based On Specific To Tenant Or Across Tenants |
| DEVICE_ID | Bigint | No | Yes | |
| EVENT_TIME | Timestamp | No | Yes | |
| RESTING_TIME | Integer | Yes | | |
| ASSET_ID | Bigint | No | No | |

The gathered data is analyzed by the analytics engine 110 by cleansing and aggregation as GPS drift may result in gaps in the data, e.g., if a vehicle or heavy machinery such as mobile farming equipment etc. has been parked overnight at a place (e.g. in a parking place), due to lack of availability of continuous data, data regarding total time spent by that asset at that location may not add to the actual duration of the stay of that asset at that location. This may be overcome by aggregating and storing intermediate data on daily basis. For example, see Table 2 illustrated below:

Table Name: LEARNED_PLACES_DEVICES_DAILY_RAW

Description: to store Learned/Discovered Places Raw Data for an asset on daily basis.

TABLE 2

| Columnname | Columntype | Isnullable | Partofkey | Remarks |
|---|---|---|---|---|
| ID | Bigint | No | Yes | |
| ACCOUNT_ID | Bigint | See Remarks | See Remarks | Optional Based On Specific To Tenant Or AcrossTenants |
| DEVICE_ID | Bigint | No | Yes | |
| EVENT_DATE | Integer | No | Yes | ddmmyyyy |
| RANK | Integer | Yes | | |
| DAY_TIME | Integer | Yes | | |
| NIGHT_TIME | Integer | Yes | | |
| IS_WEEK_DAY | Boolean | No | | |
| ASSET_ID | Bigint | No | No | |

The data may be further analyzed for each asset based learned/discovered places data on monthly basis. In an embodiment, non-performing asset (NPA) analysis may be performed on a monthly basis. Thus, to determine a significant change in asset behavior with respect to place of stay or location of rest, further aggregation of data may be performed on monthly basis as shown below in Table 3.

Table Name: LEARNED_PLACES_DEVICES_MONTHLY_RAW

Description: to store Learned/Discovered Places Raw Data for an asset on monthly basis.

TABLE 3

| ColumnName | ColumnType | isNullable | PartOfKey | Remarks |
|---|---|---|---|---|
| ID | Bigint | No | | |
| ACCOUNT_ID | Bigint | No | | Optional Based On Specific To Tenant Or Across Tenants |
| DEVICE_ID | Bigint | No | | |
| EVENT_MONTH | Integer | No | | mmyyyy |
| RANK | Integer | Yes | | |
| WEEK_DAYS | Integer | Yes | | |
| WEEKEND_DAYS | Integer | Yes | | |
| NIGHT_DAYS | Integer | Yes | | |
| TOTAL_DAYS | Integer | Yes | | |
| DAY_TIME | Integer | Yes | | In Minutes |
| NIGHT_TIME | Integer | Yes | | In Minutes |
| TOTAL_REST_TIME | Integer | Yes | | In Minutes |
| AVERAGE_DAY_TIME | Integer | Yes | | Rounded In Minutes |
| AVERAGE_NIGHT_TIME | Integer | Yes | | Rounded In Minutes |
| AVERAGE_REST_TIME | Integer | Yes | | Rounded In Minutes |
| ASSET_ID | Bigint | No | | |

Additionally or alternatively, the data may be further analyzed for each asset based learned/discovered places of interest data on a weekly basis. This aggregation of data may be performed on a weekly basis to determine if any significant behavior and/or change in behavior is observed as illustrated in Table 4 below.

Table Name: LEARNED_PLACES_DEVICES_WEEKLY_RAW

Description: to store Learned/Discovered Places Raw Data for an asset on weekly basis.

TABLE 4

| ColumnName | ColumnType | isNullable | PartOfKey | Remarks |
|---|---|---|---|---|
| ID | Bigint | No | Yes | |
| ACCOUNT_ID | Bigint | See Remarks | See Remarks | Optional Based On Specific To Tenant Or Across Tenants Use Case |
| DEVICE_ID | Bigint | No | | |
| EVENT_WEEK | Integer | No | | wwyyyy |
| RANK | Integer | Yes | | |
| WEEK_OF_YEAR | Integer | Yes | | |
| WEEK_DAYS | Integer | Yes | | |
| WEEKEND_DAYS | Integer | Yes | | |
| NIGHT_DAYS | Integer | Yes | | |
| TOTAL_DAYS | Integer | Yes | | |
| DAY_TIME | Integer | Yes | | In Minutes |
| NIGHT_TIME | Integer | Yes | | In Minutes |
| TOTAL_REST_TIME | Integer | Yes | | In Minutes |
| AVERAGE_DAY_TIME | Integer | Yes | | In Minutes - Rounded |
| AVERAGE_NIGHT_TIME | Integer | Yes | | In Minutes - Rounded |
| AVERAGE_REST_TIME | Integer | Yes | | In Minutes - Rounded |
| ASSET_ID | Bigint | Yes | | |

Rules are used to determine change of ownership score by evaluating a set of places of interest using a pre-defined criteria. For example, for no new places of interest in this list is assigned a score=0; for no new place of interest in previous month and some new places of interest in current month, the assigned score would be percentage of number of days recorded/total number of days capture has been taken. Additionally or alternatively, there may be cases where one of the primary location/place of interest has changed. For example, in one case: home location is the same, but the office location has changed, which may happen in different scenarios: first, in case of ownership change but home location is the same location, for example, the vehicle/asset is sold to another entity/person living in the same apartment complex, general neighborhood; second, no change in owner or low probability of change of owner as the office may have moved to another location or instead of husband, wife may have started taking this car to her office. In another exemplary case: office location is the same, but the home location has changed in which case there is a probability that the asset may have been sold to a new owner in the same office or the original owner may have moved to a home at a different location. In yet another exemplary case, both the primary locations/places of interest have changed in which case there is a high probability of ownership change. A person skilled in the art may readily understand that although some examples of calculating probability of change of ownership are provided here, other examples may exist and are also within the scope of this invention.

Additionally, in an embodiment, this prediction score may be further enhanced or augmented by change in driving pattern, e.g., if there is a mismatch in the driving score pre and post predicted change of ownership based on location data, the probability of change of ownership may be even more. Similarly, in an embodiment, the prediction score may be further enhanced or augmented by change in usage pattern of the asset, e.g., if there is a change in usage pattern of the asset pre and post predicted change of ownership based on location data and/or driving pattern data, the probability of change of ownership may now be further more.

In an embodiment, a service application programming interface (API) may be provided to enable ownership change services (OCS) for the asset and to query the ownership change (OC) status. The service API may be used to configure/enable ownership change service (OCS) for the asset; update and retrieve OCS score of the asset; and/or delete OCS record.

Figure 2:
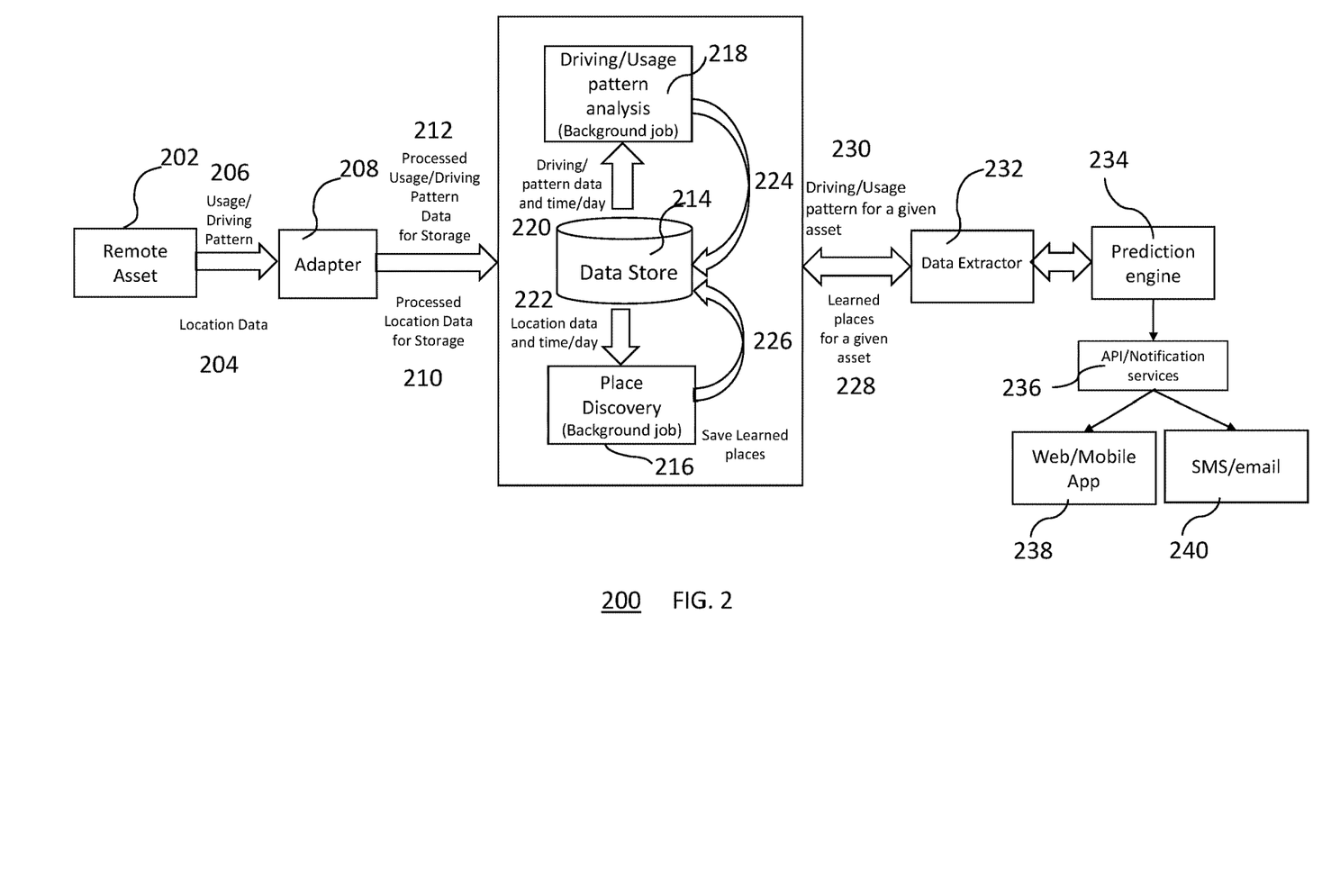
FIG. 2 illustrates a process and system for automated detection of change of ownership of one or more assets according to an embodiment described herein.

FIG. 2 illustrates a process and system 200 for automated detection of change of ownership of one or more assets according to an embodiment described herein. In an embodiment, a remote/mobile asset 202 sends location data 204 to a server, also known as an adapter, 208. The remote/mobile asset 202 may additionally send the asset usage data and driving pattern data 206 to the server 208. The adapter 208 processes the received location data 204 and/or driving pattern data and/or asset usage data, to remove anomalies and standardizes it and sends it to a data storage also known as data store 214.

Background jobs 216 and 218 are performed by a processor at pre-determined intervals, for example, every day, every week, every month, at the end of a trip etc., that discovers places where mobile assets, for example, vehicles, heavy machinery such as mobile farming equipment etc., have stopped during each interval via step 216 as well as peculiar driving pattern of the person using the asset and/or a peculiar asset usage pattern for the asset via step 218. This data is also saved into the data store 214 via steps 226 and 224 respectively.

This processed data, e.g., location data 228 and driving and/or usage data 230 is then further processed by a data extractor 232 and used by a prediction engine 234 to predict change of ownership for the asset.

Service API 236 may be provided to enable ownership change services (OCS) for an asset and to query the ownership change (OC) status. The service API 236 may be used to configure/enable ownership change service (OCS) for an asset; update and retrieve OCS score of the asset; and/or delete OCS record.

A request to view a change in the ownership of an asset may be sent by the OEM or financer of the asset via user interface provided by web application or mobile application 238 to the server 208 and/or sent to the user interface as SMS and/or email.

FIGS. 3A, 3B, 3C and FIGS. 4A, 4B and 4C illustrate exemplary algorithms used to detect change of ownership of an asset. In an embodiment, an example algorithm to detect change of ownership of an asset over a period of time based on location detection and may include following steps. Step 1: identify top N places of interest per asset; Step 2: prepare data model for machine learning; Step 3: categorize places/place of interest; Step 4: daily updates of the data model; and step 5: detection of change of ownership. In an embodiment, the exemplary algorithm may further include analyzing driving pattern to augment change of ownership prediction score using driving pattern score. In yet another embodiment, the exemplary algorithm may further include analyzing asset usage pattern to augment change of ownership prediction score using asset usage pattern score.

Figure 3A:
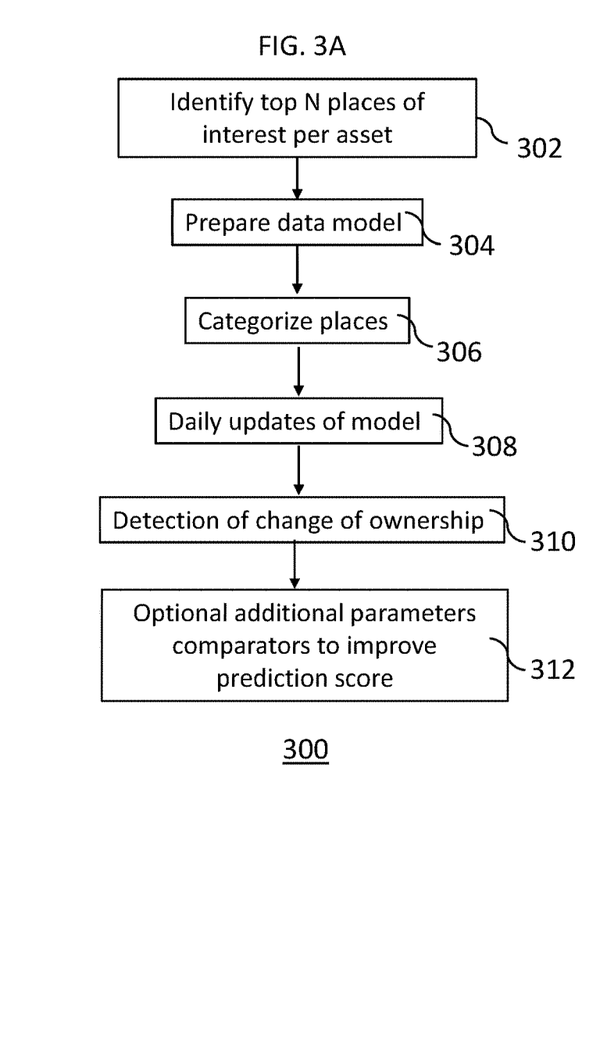
FIGS. 3A, 3B and 3C illustrate a process for automated detection of change of ownership of one or more assets according to an embodiment described herein.

Different steps performed by the example algorithm to detect change of ownership of an asset over a period of time based on location detection are illustrated by FIG. 3A and described as follows. Step 1, 302, identifying top N places of interest per asset includes, for example, finding the top places visited for a given asset; selecting top N places from this list based on heuristics, for example, top 10% places—if there are 100 places, take 10 places based on recurrence frequency/pattern, for example, every day, every week day, x number of days in a week, x number of days in a month etc.; and gathering data regarding resting time at each of the top N places, for example, resting time per occurrence, resting time per time period, e.g., daily/weekly/monthly etc. Table 2 illustrates "Learned Places Raw Data for an asset on daily basis", Table 3 illustrates "Learned Places Raw Data for an asset on a monthly basis" whereas Table 4 illustrates "Learned Places Raw Data for an asset on a weekly basis".

As only a few places may be of significance in a given/chosen period of time, in the simplest form of the algorithm, number of entries for each resting place in the given/chosen period of time may be used for categorization. By selecting places on the basis of number of times a particular location has been visited by the asset may provide a fair selection of places of interest for that over a period of time. Persist these places of interest as part of data model for machine learning so that this data model gets updated on every iteration when new place data becomes available. The actual process of updating may be triggered by using a script that runs at periodic intervals, for example, once a day, once a week etc. An alternate way to trigger the discovery process may be through a streaming API that analyzes a trip as soon as it ends and stores the stop-locations during the trip. Alternatively, the discovery process may be defined as an ongoing process, collecting device data for the assets in near-real time.

The discovered/learned places may then be clustered by the clustering engine 116 of the data processing system 102 to form bigger groups based on location as illustrated by FIG. 1 and described above. For example, locations of interest detected by the system, within a proximity radius of, for example, a few hundred meters from a known place of interest, may be grouped together as a cluster. The radius of proximity may thus define the granularity of the discovered/learned place on a map. Several such collections or clusters with different radii of separation, all of which may be derived from the base collection with lowest granularity, may be stored in database 108 and presented to the user via user interface 118 as illustrated by FIG. 1 and described above. Although the example provided here uses a few hundred meters as a radius of proximity, other radii of proximity may be used as discussed before.

One of the typical problems associated in using aggregates of several places is the inherent risk of placing the aggregated value on a location which may or may not be an actual location on the map, for example, the aggregate location may turn out to be a water body in the area. The algorithm of the present invention is designed to avoid such a situation by taking the modal value when aggregating over nearby locations. Different criteria may be used when creating the locations of interest with larger radius of separation, for example, the criteria used for aggregating may specify that "all locations must be 'at least' Y meters away from each other" where various values of Y may be used for creating locations or location clusters with different granularity.

The pre-defined criteria for inclusion may include any of: time of the visit, duration of time spent by the at least one asset at the location, number of visits to the location, and frequency of visits such as daily, weekly, monthly by the at least one asset to the location, or a combination thereof.

Step 2, 304, preparation of a data model for machine learning and analysis further includes aggregating the data such as the amount of time spent on a place, at a predetermined frequency, e.g., daily, weekly, monthly etc. One or more tables may be used to store list of top places of interest per asset for providing simple database operations, for example, create, read/retrieve, update/modify and delete/destroy (CRUD), for OCS service, for example, one record per asset to enable OCS and to store computed OCS score and related parameters for that asset.

Step 3, categorization of places 306 includes using particular attributes from daily, weekly or monthly data. For example, from monthly data one or more of the following attributes may be used: total number of days a place/location is visited, number of nights spent at a particular location, average day time spent at that location, average night time spent at that location. This data is then used to classify places in different categories, for example, if significant (days ≥10), a nightly resting place may be categorized as home, and other locations depending on the time of the day and duration of time spent at that location may be categorized as work location or visiting location. If the data is of medium significance (days ≥3 but <10, the location may be used for categorization of places. The data may be categorized as insignificant, if frequency of occurrence is less, for example, less than 3 days in a month, and may not be used for categorization of places. An example of categorization of data is shown below:

```
#categorize
   def
       categorize_place_monthly(self
       , mon_rec) : place_category =
       'INSIGNIFICANT'
       if (mon_rec['TOTAL_DAYS'] >= TOTAL_DAYS_HIGH_CHECKMARK) :
```

```
# Data is significant TOTAL_DAYS_CHECKMARK default 10
                # classify as parking/resting place -
                        NIGHT_DAYS_CHECKMARK =
10 days, AVERAGE_NIGHT_TIME_CHECKMARK =
6 hours and WEEKEND_DAYS_CHECKMARK =1
                if (mon_rec['NIGHT_DAYS'] >=
NIGHT_DAYS_CHECKMARK) and (mon_rec['AVERAGE_NIGHT_TIME'] >=
(AVERAGE_NIGHT_TIME_CHECKMARK * 3600) ) and
(mon_rec['WEEKEND_DAYS'] >= WEEKEND_DAYS_CHECKMARK) :
                        place_category =
                        'HOME_NIGHTLY_RESTING_LOCATION' elif
                        (mon_rec['AVERAGE_DAY_TIME'] >=
(AVERAGE_DAY_TIME_CHECKMARK*3600) ) :
                        place_category =
                        'WORK_LOCATION' else:
                place_category = 'VISITING_LOCATION'
                        elif (mon_rec['TOTAL_DAYS'] >=
                        TOTAL_DAYS_MEDIUM_CHECKMARK) :
        place_category = 'MEDIUM_SIGNIFICANCE'
                mon_rec['CATEGORY'] =
                place_category return
                mon_rec
```

Step 4, updates of the model at predefined intervals of time 308, for example, daily updates, may include updating the raw data (daily, weekly, monthly) with newly learned/discovered places. Table 2 illustrates "Learned Places Raw Data for an asset on daily basis", Table 3 illustrates "Learned Places Raw Data for an asset on a monthly basis" whereas Table 4 illustrates "Learned Places Raw Data for an asset on a weekly basis". This updating of data model for machine learning may include updating raw data as well as updating categorization.

Step 5, detection of change of ownership 310 may include analyzing learned/discovered places data. This detection is based on the assumption and expectation that a particular asset gets parked on a certain location on regular basis, so if that space is getting changed then it may be represent a trigger that the ownership of that asset is changed. Such detection is based on, for example, how the top places of interest fared in last one week, is there addition of a new place to the existing list of places of interest, is there a recurrence of the new place that has been added, is there a decline/change in the recurrence pattern of existing identified place of interest.

Learned/discovered places of interest from a particular duration of time may be selected for the detection of change of ownership. For example, from the current time take a span of current month and previous month (previous month is chosen so that we have a complete month data to compare against to compute score. In the partial month new places can be detected but they will not be fully able to determine ownership change outcome. For example, if current date is 15 May 2019 then consider the time period for evaluation as complete month: 1 Apr. 2019-30 Apr. 2019 and partial month: 1 May 2019-15 May 2019. Find delta places (addition/deletion) for this time. Process to find new discovered/learned places may include: find all the distinct places that have been discovered/learned during the above selected time periods; compare new set of places discovered during the current month with the places that were discovered/learned in the previous month. Calculate two sets of learned/discovered places: one set listing new places that have been discovered/learned during current period and another set listing older places from the previous months that have been removed from the current list of places.

Rules are used to determine change of ownership score by evaluating a set of places of interest using a pre-defined criteria. For example, for no new places of interest in this list is assigned a score=0; for no new place of interest in previous month, but some new places of interest in current month: the assigned score would be percentage of number of days recorded/total number of days capture has been taken. Additionally or alternatively, there may be cases where one of the primary location/place of interest has changed. For example, in one case: home location is the same, but the office location has changed, which may happen in different scenarios: first, ownership is changed but home location is the same, for example, the vehicle/asset is sold to another entity/person living in the same apartment complex, general neighborhood; second, no change in ownership or low probability of change of owner as the office may have moved to a new location or instead of husband, wife may have started taking this car to her office. In another exemplary case: office location is the same, but home location has changed in which case there is a probability that the asset may have been sold to a new owner in same office or the original owner may have moved to a home at different location. In yet another exemplary case, both the primary locations/places of interest have changed in which case there is a high probability of ownership change. A person skilled in the art may readily understand that although some examples of calculating probability of change of ownership are provided here, other examples may exist and are also within the scope of this invention.

Figure 3B:
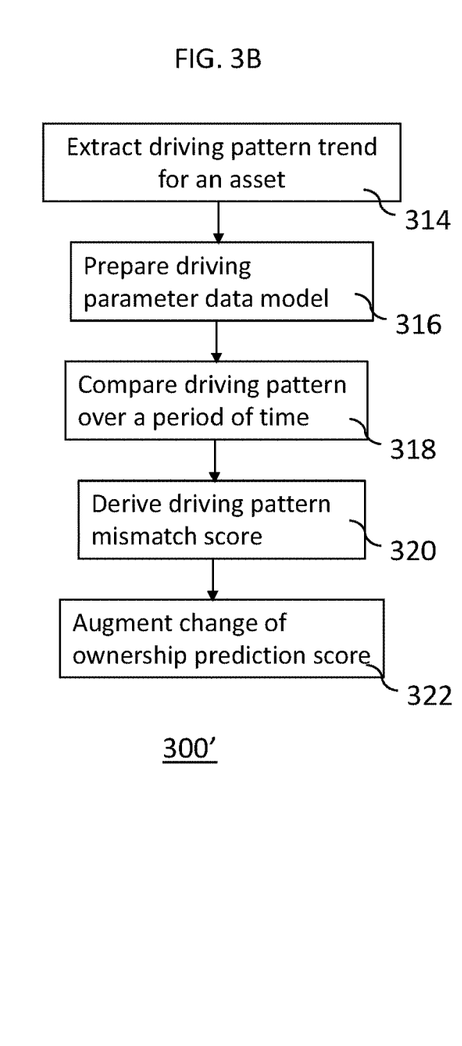

Additionally, in an embodiment, this prediction score may then be further enhanced or augmented via step 312, for example, by change in driving pattern, e.g., if there is a mismatch in the driving score pre and post predicted change of ownership based on location data, the probability of change of ownership may be even more as illustrated in FIG. 3B. Similarly, in an embodiment, the prediction score may be further enhanced or augmented via step 312, for example, by change in usage pattern of the asset, e.g., if there is a change in usage pattern of the asset pre and post predicted change of ownership based on location data and/or driving pattern data, the probability of change of ownership may now be further more as illustrated in FIG. 3C.

Figure 3C:
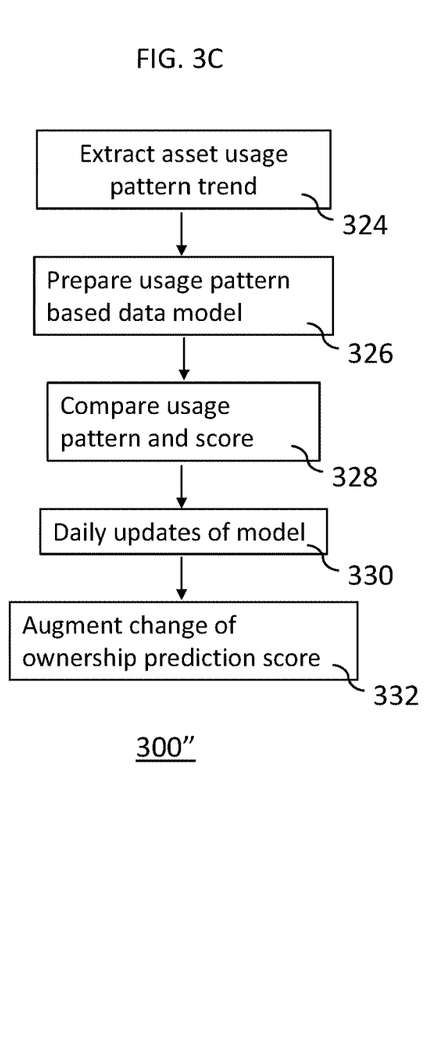

Determination of driver behavior change based on driving events and/or driving score as illustrated in FIG. 3B and/or asset usage change based on usage pattern events and/or score as illustrated in FIG. 3C may also be used in addition to the discovered/learned places data to detect and confirm, or provide higher predictability of change of ownership of the asset.

FIG. 3B illustrates an exemplary process for determination of driver behavior change based on driving events and/or driving score. The method includes extracting driving pattern trend for an asset, for example, a vehicle, heavy machinery such as mobile farming equipment etc., via step 314, preparing driving parameter data model for machine learning training via step 316, comparing driving pattern over a period of time via step 318. The method further includes deriving driving pattern mismatch score via step 320, and augmenting change of ownership prediction score via step 322. The method may also include updating driving pattern data model for machine learning at a predetermined interval of time.

FIG. 3C illustrates an exemplary process for determination of asset usage change based on usage pattern events and/or score. The method includes extracting asset usage pattern for an asset via step 324, preparing usage pattern based data model for machine learning for the asset via step 326, comparing usage pattern and driving score for the asset over a period of time via step 328, updating usage pattern based data model for machine learning at a predetermined interval of time via step 330, and augmenting change of ownership prediction score via step 332.

Figure 4A:
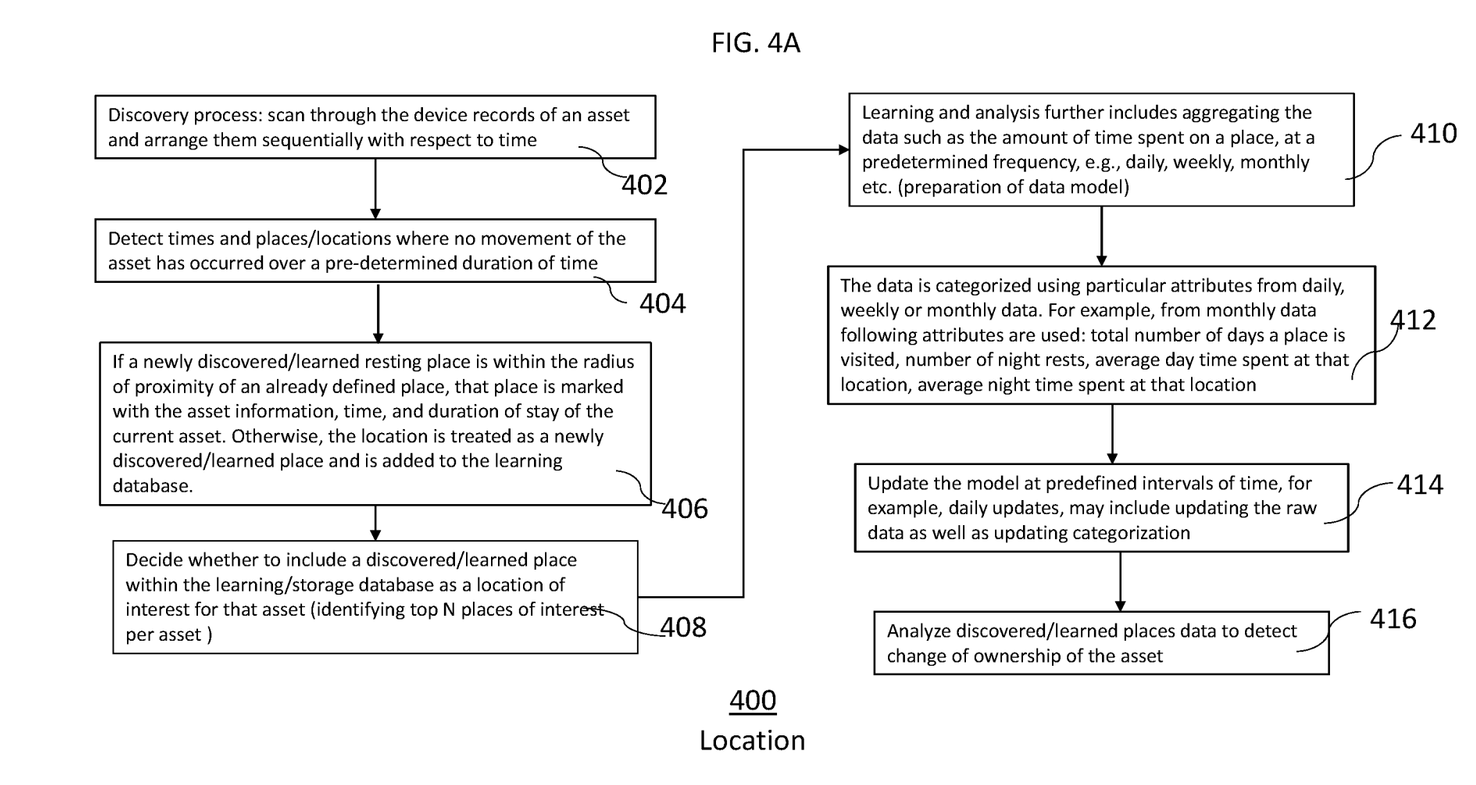
FIGS. 4A, 4B, 4C illustrate a process and system for automated detection of change of ownership of one or more assets according to an embodiment described herein.
Figure 4B:
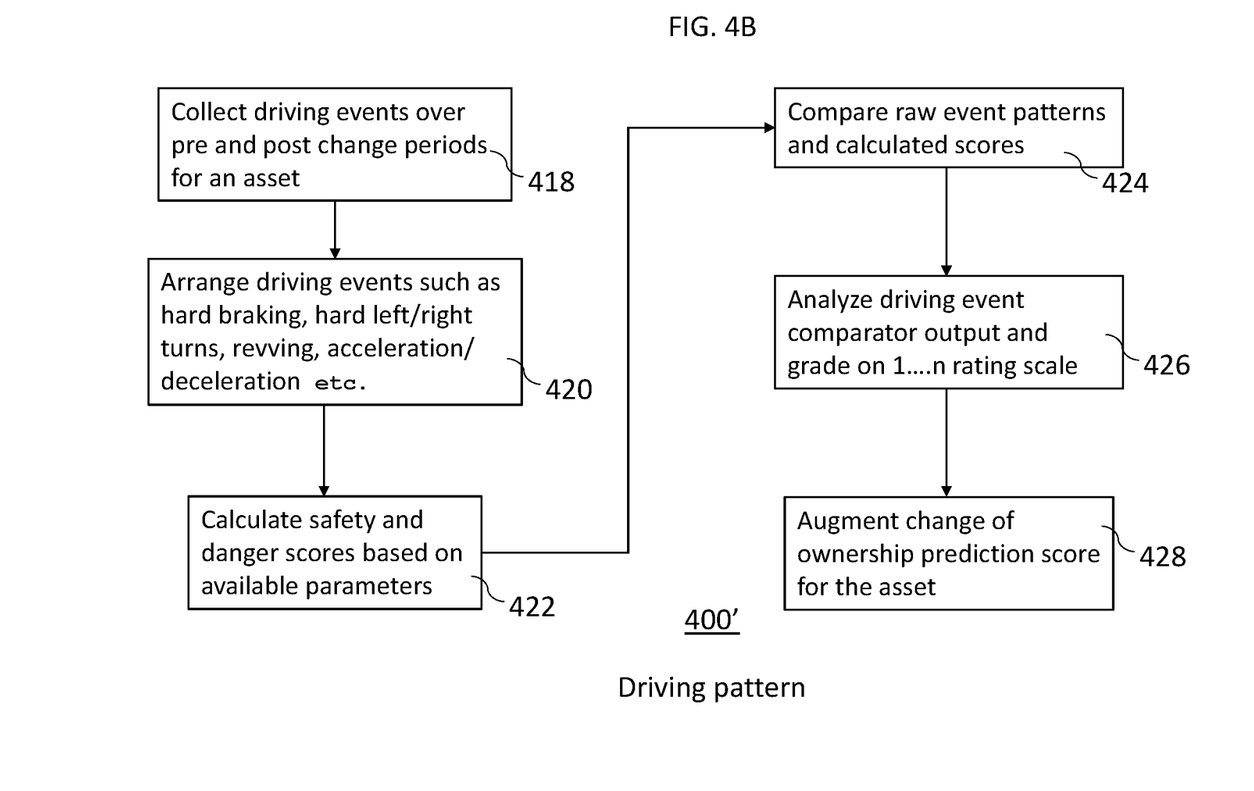
Figure 4C:
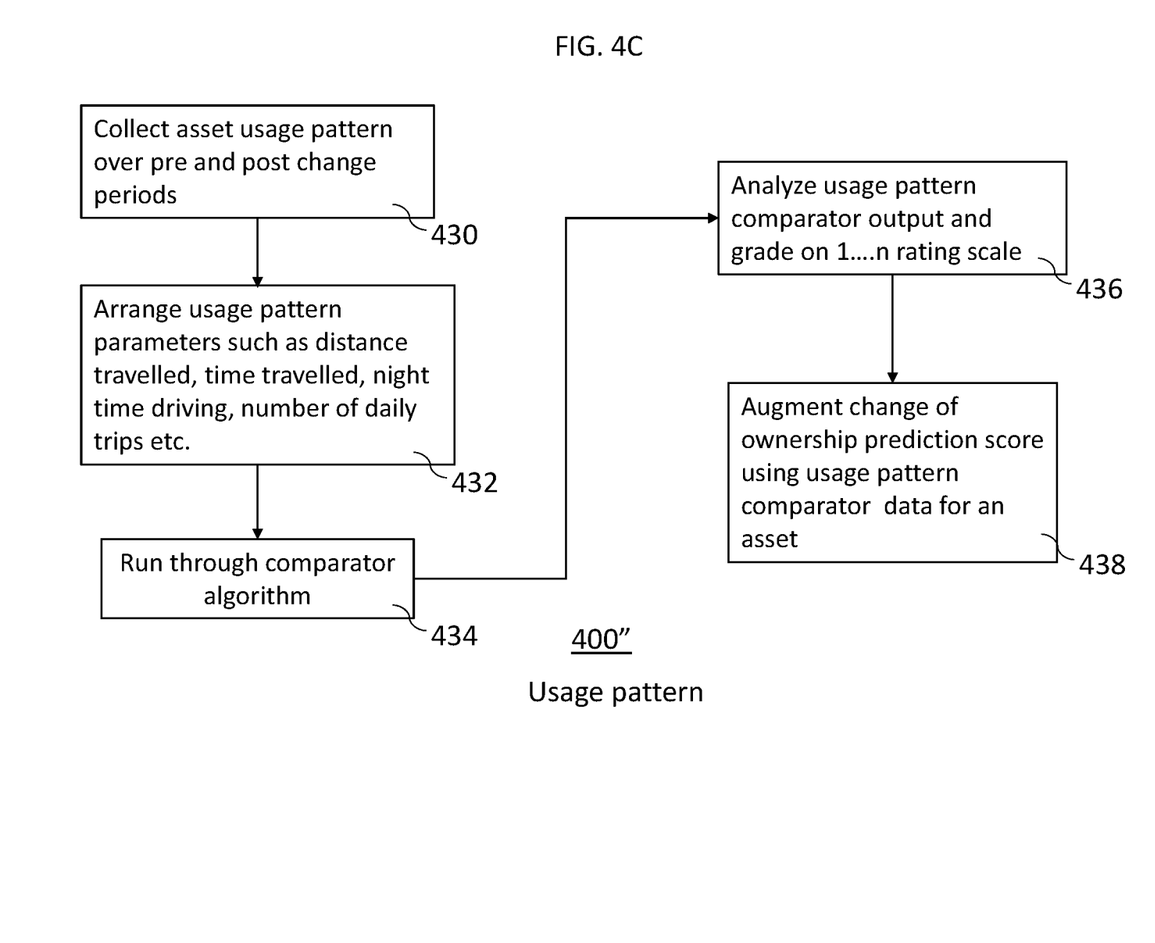

FIGS. 4A, 4B and 4C illustrate exemplary processes used for automated detection of change of ownership of one or more assets according to an embodiment described herein. In an embodiment, as illustrated in FIG. 4A, the method utilizes an algorithm that works incrementally on collected device records for the asset, for example, asset identifier, location of the asset, location of the stop, duration of stop, time of the day for the stop, day of the week for the stop, etc.

The algorithm may first scan through the device records for the assets and arrange them sequentially with respect to time, also called as a discovery process via step 402. It may then detect times, e.g., date, day of the week, time of the day etc., and places, e.g., address, latitude-longitude etc., where no movement of the mobile asset has occurred over a pre-determined time duration via step 404. The pre-determined duration may be determined by the OEM or financer of the asset or the person responsible for doing so and may include, e.g., half an hour, an hour, 2 hours, 3 hours, 4 hours etc. These may be labelled as resting places for the mobile asset, for example, the vehicle, heavy machinery such as mobile farming equipment etc. The algorithm may then make a decision about inclusion of a place within the storage database as a resting location of the asset such as home of the vehicle owner/user or place of work of the vehicle owner/user via step 408. Table 1 illustrates an exemplary data table for gathered data.

The discovered/learned places may then be clustered to form bigger groups based on location. For example, locations of interest detected by the system, within a proximity radius of a few hundred meters from a known place of interest, may be grouped together as a cluster. The radius of proximity may thus define the granularity of the discovered/learned places on a map. Several such collections or clusters with different radii of separation—all of which may be derived from the base collection with lowest granularity may be stored. Although the example provided here uses a few hundred meters as a radius of proximity, other radii of proximity may be used as discussed before.

One of the typical problems associated in using aggregates of several places is the inherent risk of placing the aggregated value on a location which may or may not be an actual location on the map, for example, the aggregate location may turn out to be a water body in the area. The algorithm may avoid such situation by taking the modal value of number of visits (e.g., highest number of visits) when aggregating over nearby locations. Different criteria may be used when creating the locations with larger radius of separation, for example, the criteria used for aggregating may specify that "all locations must be 'at least' Y meters away from each other" where various values of Y, and/or units as chosen by the user or the fleet operator, may be used for creating locations or location clusters with different and/or desired granularity.

The radius of proximity that is used for determining proximity of places may be defined by the user or provided to the system, by the OEM or financer of the asset or the party responsible for doing so, and may use units such as meters, kilometers, yards, miles etc., for example, 50 meters, half a kilometer, 50 yards, one mile etc. If a newly discovered/learned resting place is within the radius of proximity of an already defined place, that place is marked with the asset information, time, and duration of stay of the current asset, otherwise, the location is treated as a newly discovered/learned place and is added to the storage database via step 406. The pre-defined criteria for inclusion may include any of: time of the visit, duration of time spent by the at least one asset at the location, number of visits to the location, and frequency of visits such as daily, weekly, monthly by the at least one asset to the location, or a combination thereof. Table 1 illustrates an exemplary data table for gathered data as described in the description accompanying FIG. 1.

The actual process of discovery, for example, step 404, may be triggered by using a script that runs at periodic intervals, for example, once a day, once a week etc. An alternate way to trigger the discovery process may be through a streaming API that analyzes a trip as soon as it ends and stores the stop-locations during the trip. Alternatively, the discovery process may be defined as an ongoing process, collecting device data for the assets in near-real time as the assets move around performing their functions.

Learning and analysis may further include aggregating the data such as the amount of time spent on a place, at a predetermined frequency, e.g., daily, weekly, monthly etc. (preparation of data model for machine learning) via step 410, also illustrated as 304 in FIG. 3A and described in description accompanying FIG. 3A.

This data is then categorized using particular attributes from daily, weekly or monthly data via step 412. For example, from monthly data following attributes are used to categorize the data: total number of days a place is visited, number of night rests, average day time spent at that location, average night time spent at that location. The model is then updated at predefined intervals of time, for example, daily updates, and may include updating the raw data as well as updating categorization of the data via step 414. The learned/discovered places data is then analyzed to detect change of ownership of the asset via step 416.

Rules are used to determine change of ownership score by evaluating a set of places of interest using a pre-defined criteria. For example, for no new places of interest in this list is assigned a score=0, for no new place of interest in previous month, some new place of interest in current month: the assigned score would be percentage of number of days recorded/total number of days capture has been taken. Additionally or alternatively, there may be cases where one of the primary location/place of interest has changed. For example, in one case: home location is the same, but the office location has changed, which may happen in different scenarios: first, ownership has changed but home location is the same, for example, the vehicle/asset is sold to another entity/person living in the same apartment complex, general neighborhood; second, no change in ownership or low probability of change of owner as the office may have moved or instead of husband, wife may have started taking this car to her office. In another exemplary case: office location is the same, but home location has changed in which case there is a probability that the asset may have been sold to a new owner in same office or the original owner may have moved to a home at different location. In yet another exemplary case, both the primary locations/places of interest have changed in which case there is a high probability of ownership change. A person skilled in the art may readily understand that although some examples of calculating probability of change of ownership are provided here, other examples may exist and are also within the scope of this invention.

Additionally, in an embodiment, this prediction score may then be further enhanced or augmented by change in driving pattern, e.g., if there is a mismatch in the driving score pre and post predicted change of ownership based on location data, the probability of change of ownership may be even more as illustrated in FIG. 4B. Similarly, in an embodiment, the prediction score may be further enhanced or augmented by change in usage pattern of the asset, e.g., if there is a change in usage pattern of the asset pre and post predicted change of ownership based on location data and/or driving pattern data, the probability of change of ownership may now be further more as illustrated in FIG. 4C.

Determination of driver behavior change based on driving events (and driving score) as illustrated in FIG. 4B and/or asset usage change based on usage pattern events and/or score as illustrated in FIG. 4C may also be used in addition to the learned/discovered places data to detect and confirm, or provide higher predictability of change of ownership of the asset.

FIG. 4B illustrates an exemplary process for determination of driver behavior change based on driving events and/or driving score. The method includes collecting driving events over pre and post change periods via step 418, arranging driving events such as hard braking, hard left/right turns, revving, acceleration/deceleration etc. via step 420 and calculating safety and danger scores based on available parameters via step 422, as described in FIG. 3B by steps 314 and 316.

The method further includes comparing raw event patterns and calculated scores via step 424 as described in FIG. 3B by steps 318, and analyzing driving event comparator output and grade on 1 . . . n rating scale via step 426. This is then used to derive driving pattern mismatch score via step 320 illustrated in FIG. 3B. The method may further include augmenting change of ownership prediction score via step 428. The method may also include updates of model at a predetermined interval of time.

FIG. 4C illustrates an exemplary process for determination of asset usage change based on usage pattern events and/or score. The method includes collecting usage pattern for an asset over pre and post change periods via step 430, arranging usage pattern parameters such as distance travelled, time travelled, night time driving, number of daily trips etc. via step 432. This usage pattern data may be additionally/alternatively analyzed on daily/weekly/monthly basis. The method further includes comparing raw event patterns and calculated scores via step 434 as described in FIG. 3C by steps 328, and analyzing usage pattern comparator output and grade on 1 . . . n rating scale via step 436.

This is then used to augment change of ownership prediction score via step 438. The method may also include updates of model at a predetermined interval of time as described in FIG. 3C by steps 330.

Figure 5:
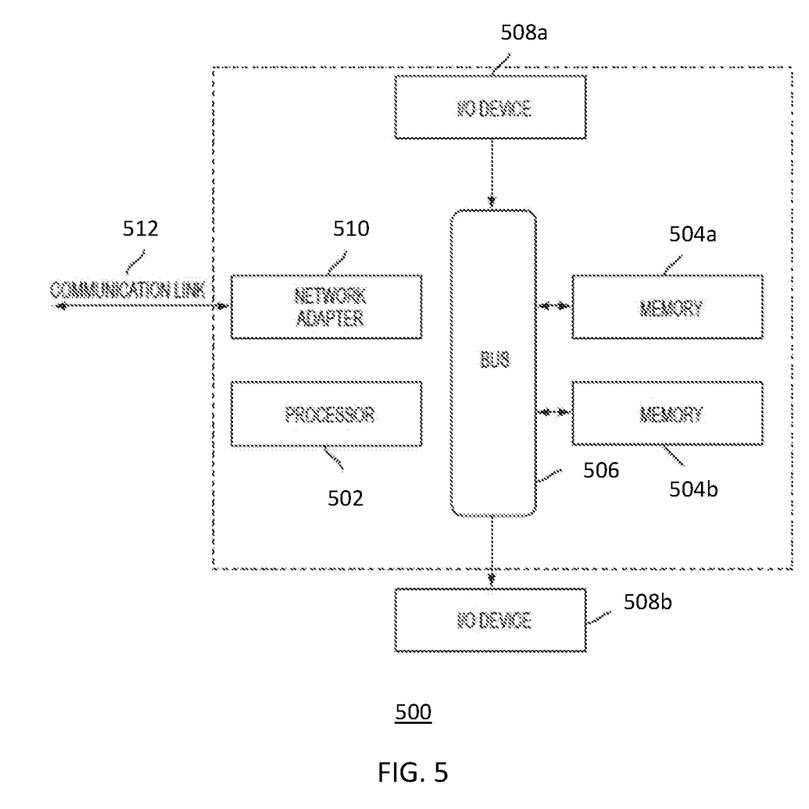
FIG. 5 illustrates a data processing system 500 suitable for storing the computer program product and/or executing program code relating to automated detection of change of ownership of one or more assets in accordance with an embodiment described herein.

FIG. 5 illustrates a data processing system 500 suitable for storing the computer program product and/or executing program code relating to automated detection of change of ownership of one or more assets in accordance with an embodiment described herein. The data processing system 500 includes a processor 502 coupled to memory elements 504*a-b* through a system bus 506. In other embodiments, the data processing system 500 may include more than one processor and each processor may be coupled directly or indirectly to one or more memory elements through a system bus.

Memory elements 504*a-b* can include local memory employed during actual execution of the program code, bulk storage, and cache memories that provide temporary storage of at least some program code in order to reduce the number of times the code must be retrieved from bulk storage during execution. As shown, input/output or I/O devices 508*a-b* (including, but not limited to, keyboards, displays, pointing devices, etc.) are coupled to the data processing system 500. I/O devices 508*a-b* may be coupled to the data processing system 500 directly or indirectly through intervening I/O controllers (not shown).

In FIG. 5, a network adapter 510 is coupled to the data processing system 502 to enable data processing system 502 to become coupled to other data processing systems or remote printers or storage devices through communication link 512. Communication link 512 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "cellular communication" is understood to include various methods of connecting any type of computing or communications devices, servers, clusters of servers, using wired and/or wireless communications networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "wireless network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI) or Bluetooth and Ethernet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer implemented method for automated detection of change of ownership of assets, the method comprising:
    learning and storing location information of at least one asset;
    detecting a location where no movement of the at least one asset has occurred over a pre-determined duration of time;
    determining whether the detected location is classified as a location of interest based on a pre-defined criteria;
    preparing a data model for the at least one asset to learn and analyze determined location of interest;
    classifying the determined locations of interests based on frequency of occurrence of pre-determined events;
    comparing new data to the data model; and
    determining probability of change of ownership of the at least one asset as a prediction score as a result of the comparison.

2. The computer-implemented method of claim 1, wherein detecting a location where no movement of the at least one asset has occurred comprises analyzing the location information of the at least one asset.

3. The computer-implemented method of claim 2, wherein the location information of at least one asset comprises latitude and longitude of the at least one asset.

4. The computer-implemented method of claim 2, wherein the location information of at least one asset further comprises any one or more of: total number of days the location is visited, number of night rests at the location, average day time spent at the location and average night time spent at the location.

5. The computer-implemented method of claim 1, wherein the pre-defined criteria for determining the location of interest comprises any one or more of: time of the visit, duration of time spent by the at least one asset at the location, number of visits at the location, and frequency of visits by the at least one asset to the location.

6. The computer-implemented method of claim 1, further comprising analyzing driving pattern for the asset to determine driving pattern mismatch score and augmenting change of ownership prediction score with the driving pattern mismatch score.

7. The computer-implemented method of claim 6, wherein the driving pattern for the at least one asset includes any one or more of: hard breaking, hard left/right turns, revving, acceleration and deceleration.

8. The computer-implemented method of claim 1, further comprising analyzing usage pattern for the at least one asset to determine usage pattern mismatch score and augmenting change of ownership prediction score with the usage pattern mismatch score.

9. The computer-implemented method of claim 8, wherein the usage pattern for the at least one asset includes any one or more of: distance travelled by the IoT device on daily/weekly/monthly basis, time travelled by the at least one asset on daily/weekly/monthly basis, night time driving by the asset on daily/weekly/monthly basis and number of daily trips by the at least one asset on daily/weekly/monthly basis.

10. A system for automated detection of change of ownership for assets, the system comprising at least one asset, and a data processing system, wherein the data processing system further comprises:
    a location-aware database, wherein the database learns and stores location information of the at least one asset;
    a processor, wherein the processor
        detects a location where no movement of the at least one asset has occurred over a pre-determined duration of time,
        determines whether the detected location is classified as a location of interest based on a pre-defined criteria;
        prepares a data model for the at least one asset to learn and analyze determined location of interest;
        classifies the determined locations of interests based on frequency of occurrence of pre-determined events;
        compares new data to the data model; and
        determines probability of change of ownership of the at least one asset as a prediction score as a result of the comparison.

11. The system of claim 10, wherein detecting a location where no movement of the at least one asset has occurred comprises analyzing the location information of the at least one asset by an analytics engine.

12. The system of claim 11, wherein the location information of at least one asset comprises latitude and longitude of the at least one asset.

13. The system of claim 11, wherein the location information of at least one asset further comprises any one or more of: total number of days the location is visited, number of night rests at the location, average day time spent at the location and average night-time spent at the location.

14. The system of claim 10, wherein the pre-defined criteria for determining the location of interest comprises any one or more of: time of visit, duration of time spent by the at least one asset at the location, number of visits to the location, and frequency of visits by the at least one asset to the location.

15. The system of claim 10, wherein the processor further analyzes driving pattern for the at least one asset to determine driving pattern mismatch score and augmenting change of ownership prediction score with the driving pattern mismatch score.

16. The system of claim 15, wherein the driving pattern for the at least one asset includes any one or more of: hard breaking, hard left/right turns, revving, acceleration and deceleration.

17. The system of claim 10, wherein the processor further analyzes usage pattern for the at least one asset to determine usage pattern mismatch score and augmenting change of ownership prediction score with the usage pattern mismatch score.

18. The system of claim 17, wherein the usage pattern for the at least one asset includes any one or more of: distance travelled by the asset on daily/weekly/monthly basis, time travelled by the asset on daily/weekly/monthly basis, night-time driving by the asset on daily/weekly/monthly basis and number of daily trips by the asset on daily/weekly/monthly basis.

19. A non-transitory computer-readable medium for automated detection of change of ownership of assets having executable instructions stored therein that, when executed, cause one or more processors corresponding to a system having a storage database, a data processing system including a processor, and a database to perform operations comprising:
   learning and storing location information of at least one asset;
   detecting a location where no movement of the at least one asset has occurred over a pre-determined duration of time;
   determining whether the detected location is classified as a location of interest based on a pre-defined criteria;
   preparing a data model for the at least one asset to learn and analyze determined location of interest;
   classifying the determined locations of interests based on frequency of occurrence of pre-determined events;
   comparing new data to the data model; and
   determining probability of change of ownership of the at least one asset as a prediction score as a result of the comparison.

20. The non-transitory computer-readable medium of claim 19, wherein detecting a location where no movement of the at least one asset has occurred comprises analyzing the location information of the at least one asset.

21. The non-transitory computer-readable medium of claim 20, wherein the location information of at least one asset comprises latitude and longitude of the at least one asset.

22. The non-transitory computer-readable medium of claim 20, wherein the location information of at least one asset further comprises any one or more of: total number of days the location is visited, number of night rests at the location, average day time spent at the location and average night-time spent at the location.

23. The non-transitory computer-readable medium of claim 19, wherein the pre-defined criteria for determining the location of interest comprises any one or more of: time of visit, duration of time spent by the at least one asset at the location, number of visits to the location, and frequency of visits by the at least one asset to the location.

24. The non-transitory computer-readable medium of claim 19, further comprising analyzing driving pattern for the asset to determine driving pattern mismatch score and augmenting change of ownership prediction score with the driving pattern mismatch score.

25. The non-transitory computer-readable medium of claim 24, wherein the driving pattern for the at least one asset includes any one or more of: hard breaking, hard left/right turns, revving, acceleration and deceleration.

26. The non-transitory computer-readable medium of claim 19, further comprising analyzing usage pattern for the at least one asset to determine usage pattern mismatch score and augmenting change of ownership prediction score with the usage pattern mismatch score.

27. The non-transitory computer-readable medium of claim 26, wherein the usage pattern for the at least one asset includes any one or more of: distance travelled by the asset on daily/weekly/monthly basis, time travelled by the asset on daily/weekly/monthly basis, night-time driving by the asset on daily/weekly/monthly basis and number of daily trips by the asset on daily/weekly/monthly basis.

* * * * *